Dec. 21, 1937.  L. C. RISHEL  2,102,915
UNIVERSAL BRAKE SHOE GRINDER GUIDE
Filed March 28, 1935   2 Sheets-Sheet 1
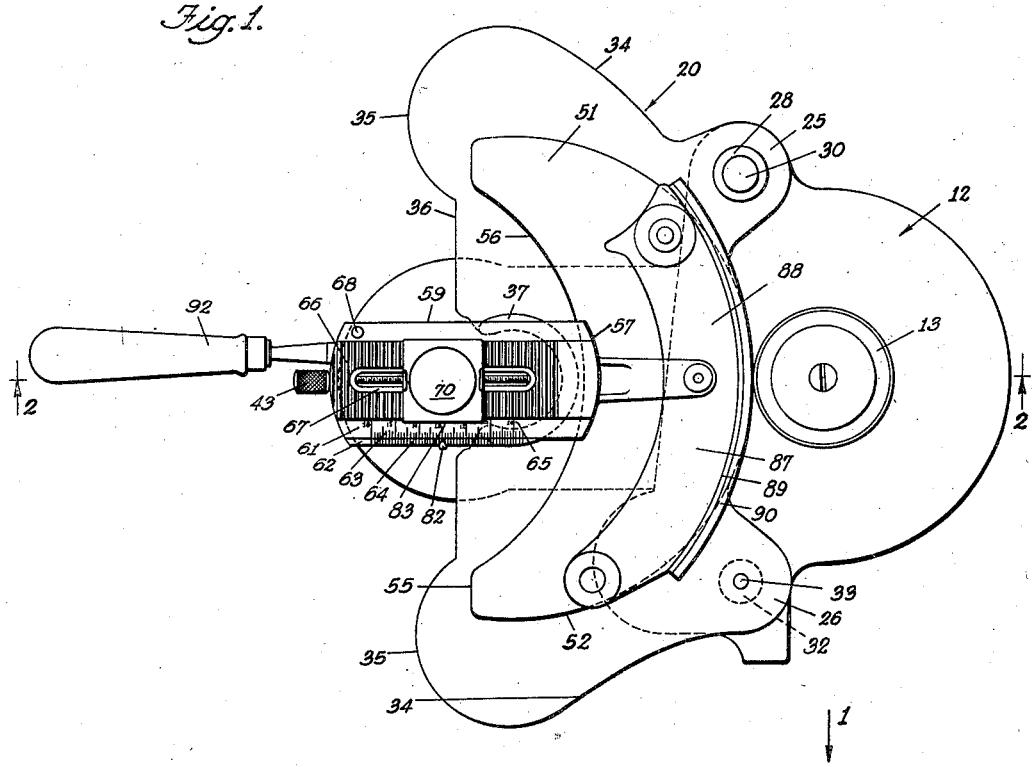
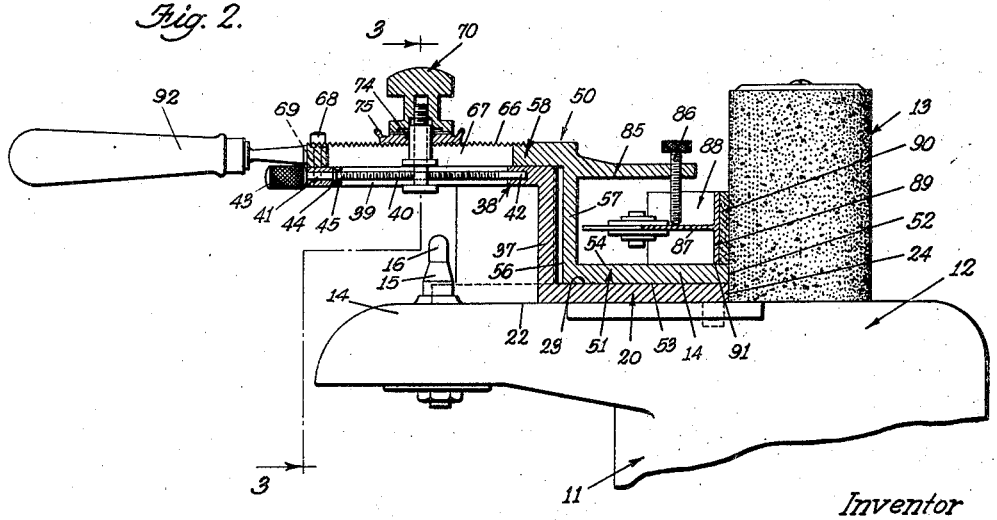
Inventor
L. C. Rishel
by Hazard and Miller
Attorneys.

Dec. 21, 1937.  L. C. RISHEL  2,102,915
UNIVERSAL BRAKE SHOE GRINDER GUIDE
Filed March 28, 1935 2 Sheets-Sheet 2

Inventor
L. C. Rishel
by Hazard and Miller
Attorneys.

Patented Dec. 21, 1937

2,102,915

UNITED STATES PATENT OFFICE 2,102,915

UNIVERSAL BRAKE SHOE GRINDER GUIDE

Luther C. Rishel, Los Angeles, Calif.

Application March 28, 1935, Serial No. 13,462

21 Claims. (Cl. 51—96)

My invention relates to a brake shoe grinder guide designed to produce a true cylindrical ground face on the brake lining attached to the brake shoe.

In certain types of brake lining grinders it is necessary to have a set of guides, these having an arcuate flange, each corresponding to brake drums of different diameters. With this type it is necessary to change the arcuate guide when brake shoes are to be ground to fit different sizes of brake drums. In another type, a plurality of removable pins may be replaced in different sockets to obtain the proper curvature for grinding the brake lining, the lining being pressed against the pins and then rotated in an arc while being brought into contact with a grinding wheel.

An object and feature of my invention is to employ a grinder guide which rotates on the axial center defining the center of a brake drum, the brake shoe being suitably clamped so that the finished surface of the lining will conform to a true cylinder of a brake drum of a definite diameter. A further feature is a construction by which a center stud on which the guide may be turned is adjustable to give a series of variable radii, thus accommodating the grinder guide and the location of the shoe to brake drums of different standard diameters.

A further feature of my invention is the provision of a fixed supporting structure attached to a grinding machine, this being in a certain relation to the grinding wheel. On this fixed structure or support is mounted the adjustable guide. The pivot stud may be adjusted radially on the fixed structure and the guide then clamped as to radial motion in relation to the stud, the stud however, permitting a rotation on the axis of the stud so that the guide may be shifted to one side of the grinding wheel for attaching and clamping the brake shoe with the lining in position on the guide.

A further feature of my invention relates to a clamp and a backing support for the brake shoe by which the brake shoe with its lining may be firmly secured to the guide structure, this clamp having contact pins to contact the inner side of the flange of a brake shoe and thus make correct adjustment for the thickness of the flange of the shoe and the thickness of the brake lining. The shoes are usually made T-shaped in cross section with a flange formed on the cylindrical brake drum on which the shoe operates and each shoe is usually provided with a central web. The web extends inward radially and hence when the lower edge of the brake shoe flange rests on a top plate on the brake shoe guide, the web occupies a horizontal position and is engaged by a clamping screw. Thus the brake shoe is held rigidly on the guide, that is on the top plate of the guide by means of the clamping screw engaging the web and adjustable pins or the like contact the inner side of the flange of the shoe.

Another object and feature of my invention is in the adjustment of the contact pins, these being preferably two in number and each mounted in a slidable plate, each plate sliding in a radial direction on the structure forming the guide. The center of the radius for these sliding plates is fixed and is preferably the mean or average radius of a series of different radii for which the particular machine is designed to grind brake linings.

Another object and feature of my invention is preferably constructing the top plate of the movable guide with an edge formed on a curvature, the radius of which is equal to that of the smallest brake drum for which the machine is designed to grind brake shoes. This guide may then be adjusted as to the rotary grinding wheel to give the desired clearance for grinding a brake shoe with its lining supported on the top plate of the guide. The sliding plates having the adjustable contact pins are each provided with a point on their outer edge, which point may be adjusted to extend beyond the peripheral edge of the top plate. These guide plates are set an equal distance on opposite sides of the central radial line through the top plate and hence define with the central point on the periphery of the top plate, three points in the circle of any radius on which it is desired to grind brake linings. The contact pins are adjustable by a micrometer adjustment to gauge the known thickness of the brake shoe flange and the desired thickness of the finished brake shoe lining.

My invention is illustrated in connection with the accompanying drawings, in which, Fig. 1 is a plan taken in the direction of the arrow 1 of Fig. 2.

Fig. 2 is a vertical section on the line 2—2 of Fig. 1, in the direction of the arrows.

Figure 3:
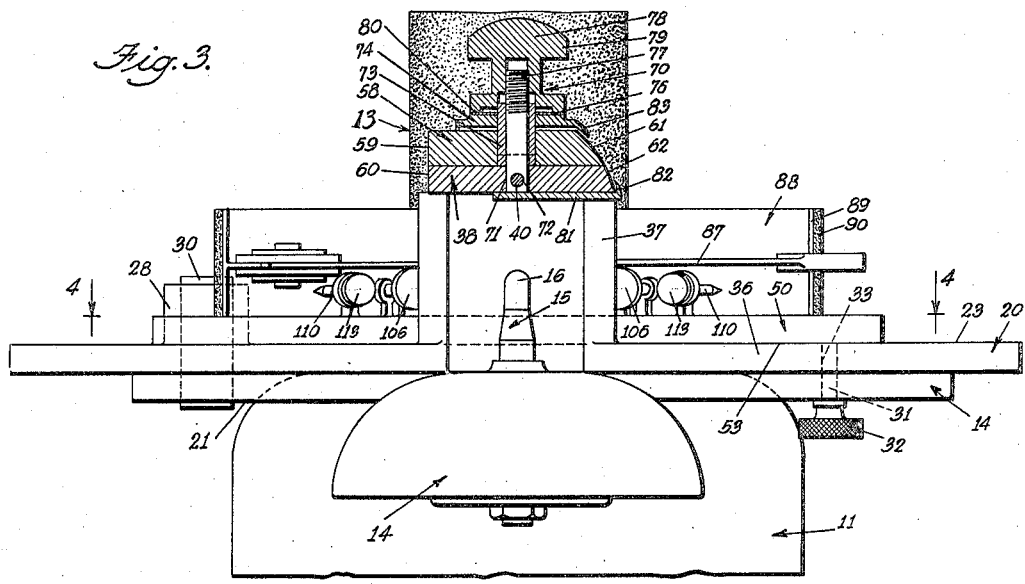
Fig. 3 is a vertical section on the line 3—3 of Fig. 2 in the direction of the arrows, this being transverse to the section of Fig. 2.

In using my invention I may apply same to a known type of brake lining grinder. Such a type has a central pedestal 11 with a head structure 12 extending above which is a rotating grinding wheel 13, this rotating on a vertical axis and having an abrasive on its periphery. In this type of machine there is a lateral extension 14 of the head on which is mounted a drilling device 15 for removing old rivets or the like from brake shoes. When not in use this is provided with a cover cap 16. This device does not enter into my invention but my guide is constructed to form a clearance with this.

In my invention I use a large flat base plate 20, with a perforation which has an undersurface 21 resting on the flat top 22 of the head 12 and the extension 14. This plate has an upper surface 23 and is provided with a convex edge 24 which is located to have a working clearance with the periphery of the grinding wheel 13. A pair of lateral ears 25 and 26 are located on opposite sides of the center line 27. One of these has a boss 28 having a perforation 29 through which extends a centering pin 30.

In the type of machine to which my invention may be attached, provision is made for a pin similar to the pin 30, therefore I adopt the setting of the plate 20 to this machine. However, if there is no provision for such a pin, a hole may be drilled in the top of a brake shoe grinder to accommodate such a pin. The ear 26 is held in place by means of a set screw 31 having a head 32 which screws upwardly through the extension 14 of the head 12. The upper end 33 of this screw is threaded into a recess in the underside of the plate 20. From the ears 25 and 26 there are two opposite laterally curved portions 34 having convex corners 35 joining into a straight section 36. These are connected by a vertical hub structure 37, this hub structure giving a clearance around the drilling device 15.

Attached to the top of the hub there is a substantial arm 38. This arm has a central slot 39 through which extends an adjusting screw 40. This screw extends through a perforation 41 at one end of the arm and has a bearing in a socket 42 at the inner end. A knurled finger grip head 43 is at the outer end of the arm. The screw is held in place by means of a collar 44 or the like, held in place by a pin 45 or similar structure. Thus the base plate with the arm 38 form a rigid structure which is attached as above described to the head 12 and the lateral extension 14 of the grinding machine.

The main guide structure for the brake shoe designated by the assembly numeral 50, employs a top plate 51. This has a convex vertical curved edge 52, the plate having a flat undersurface 53 and also a flat top surface 54. A radius of the curve 52 is that of the smallest sized brake drum for which linings are to be ground with my machine and the setup. The convex curved edge terminates at two vertical edges 55 in alignment, these being connected by a vertical concave edge 56, which in all conditions of operation is spaced from the hub 37 of the base plate.

Figure 4:
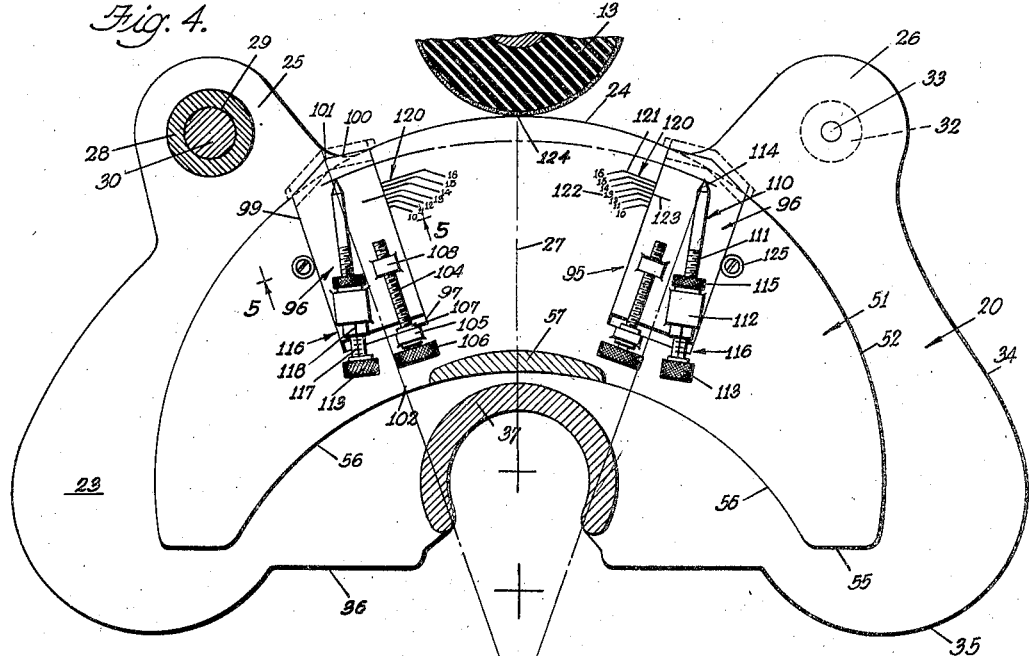
Fig. 4 is a horizontal section on the line 4—4 of Fig. 3 in the direction of the arrows.

Extending vertically from the top plate 51 and adjacent the center of the concave edge 56 there is an arcuate vertical short post 57, this being shown in horizontal section in Fig. 4 and in vertical section in Fig. 2. Formed integral with the post 57 there is a substantial arm 58. This arm has a flat lower and upper surface and one edge 59 is preferably in alignment with the edge 60 of the fixed arm 38 of the base. The other edge 61 of the arm 58 has a bevelled slope considered transversely (note Fig. 3) and forms a continuation surface with the edge 62 of the fixed arm 38. The surface 61 is provided with scale graduations 63 and the surface 62 with scale graduations 64 (note Fig. 1); these being similar and on one of these preferably in conjunction with the scale 63, there are numerals 65 which designate the diameter of the brake drums to the curvature of which the brake linings are to be ground.

In the center portion of the arm 58 there are a series of V-shaped teeth 66 and also extending longitudinally of the arm there is a slot 67. This slot registers with the slot 39 of the fixed arm 38. In order to retain these arms in alignment, a retaining pin 68 which is removable, extends through perforations 69 in both the arms 58 and 38.

The adjustable center pivot stud designated by the assembly numeral 70 consists of a central stud member 71 (note particularly Fig. 3), which passes vertically through the slot 39 in the fixed arm 38, which arm as above mentioned is secured to the vertical hub 37. The adjusting screw 40 is threaded through a perforation 72 in the stud member 71. A sleeve 73 is fitted on the stud member and the sleeve and stud member pass through a clamping plate 74 which plate has teeth on its undersurface to engage and register with the teeth 66 on the upper surface of the arm 58. This locking plate is preferably rectangular and bridges the slot 67 of the arm 58. The clamping plate is provided with a finger tab 75 to facilitate lifting of such plate for purpose hereinunder detailed. A spring washer 76 surrounds the sleeve 73 in the stud member 71. The upper end of the stud is threaded at 77 and on this is threaded a clamping nut 78. This nut has a large head 79 preferably knurled to form a hand grip and has an annular lower surface 80 to bear on the spring washer 76 and thus to transmit a clamping pressure on the clamping plate 74.

In order to indicate the correct adjustment of this movable pivot stud, a lower pointer arm 81 is fixedly secured to the lower end of the stud 71 and extends transversely to one side under the arm 38. This has an upturned pointer finger 82 which registers with the scale 64 on the side edge 62 of the lower arm 38. An upper pointer finger 83 is attached to one side of the clamping plate 74 and extends partly over the edge 61 of the upper arm 58 to register with the scale 63 on this edge.

The manner of clamping a brake shoe with the brake lining thereon for grinding is as follows: A substantial clamping arm 85 is secured to the upper end of the short post 57, being preferably integral therewith and is in alignment with the arm 58. At the outer end of the arm 85 there is a clamping screw 86 threaded through the arm. The lower end of this clamping screw 86 is adapted to engage the web 87 of the brake shoe 88 which shoe has an arcuate flange 89 extending on opposite sides of the web and to which flange is secured the brake lining 90 which lining is to be ground to the correct cylindrical curve of a brake drum with which it operates. The lower edge 91 of the flange and of the brake lining rests on the upper surface 54 of the movable top plate 51 and if this brake shoe is of a size to operate with the smallest size brake drum for which the present machine is designed to grind, the arcuate edge 52 of the movable top plate 51 will parallel the flange of the brake shoe and the lining secured thereto, but where the brake shoe works with the brake drum of larger diameter, the end portions of the shoe and its lining will extend beyond the edge 52 as shown in Fig. 1. A handle 92 is provided on the combined arms 58 and 85 so that the top plate 51 may be rotated in an arc with the pivot stud as a center as hereinunder detailed.

Figure 5:
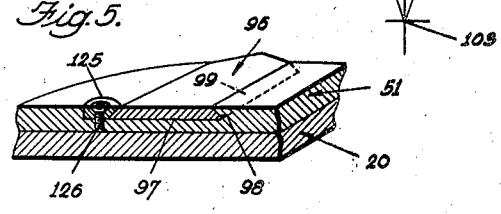
Fig. 5 is a detail vertical section on the line 5—5 of Fig. 4 in the direction of the arrows.

In order to accurately center and hold a brake shoe clamped on the top plate 51, I employ an inner contact assembly designated 95 (note particularly Figs. 3 and 4). This employs two slidable plates 96 which slide in flat grooves or recesses 97 in the top plate 51. These grooves are preferably dove-tailed as indicated at 98 of Fig. 5. Each plate 96 thus has two parallel side edges 99 and the outer edge 100 has two slopes meeting at a vertical edge 101. The center line 102 through this vertical edge and the axial center of each sliding plate 96 preferably forms a radius from a certain center 103. This point is such that it defines the center of the mean radii for which the machine is designed to grind brake linings. For instance, in the scale 63 the numerals 65 indicate that the particular setup is designed to grind brake shoes to fit brake drums 10" to 16" in diameter. Thus the center 103 would be at a position for a brake drum 13" in diameter, thus 6½" in radius.

The means for moving each of the sliding plates 96, comprises an adjusting screw 104 which extends through a fixed lug 105 on the top plate 51. This screw has a knurled head 106 and is prevented from endwise movement by collars 107. The screw when is threaded through a boss 108 in the plate 96. Thus by rotating the screws 104 the two plates 96 may be adjusted longitudinally.

In order to obtain the correct adjustment of each brake shoe I employ two contact pins 110. Each of these pins is provided with screw threads 111 operating through a threaded boss 112 secured to each of the plates 96. The axis of the pin is as near the radius line 102 as it may be conveniently located. One end of the pin has an operating knurled head 113 and the opposite end has a conical pointed end 114. On the threaded portion 111 there is a knurled lock nut 115. A vernier 116 has graduations 117 on each pin 110 adjacent its head 113, which graduations may register with a fixed line 118 on the boss 112.

The manner of adjusting the plates 96 is as follows: On the top plate 51 there are a series of graduations 120 marked off with lead lines 121 to numerals 122, these numerals corresponding to the diameters of the drums indicated on the scales 63 and 64 by the numeral 65. A registry line 123 is formed on each slide plate 96.

The manner of operating my invention is as follows: When the pivot stud designated by the assembly numeral 70 is in place, extending through both of the arms 38 and 58 and the pin 68 is in the perforations or sockets 69, these two arms are held in alignment. The pivot stud is then adjusted lengthwise of the slots 39 and 67 by means of the adjusting screw 40 which is operated by the knurled head 43. However, before the stud can be moved it is necessary to loosen the nut 79 threaded on the upper end of the stud member 71 and also to lift the clamping plate 74 by means of the finger grip tabs 75 to form a clear disengagement of the teeth 66 on the arm 58 and the teeth on the underside of the clamping plate 74.

Presuming the brake drum is of a true diameter as originally constructed on a wheel: this is usually a certain definite number of inches in diameter and the pivot stud is so adjusted until the pointer fingers 82 and 83 connected to the stud and the clamping plate respectively, register with the same diameter number on the scales 63 and 64. In the illustrations of Fig. 1, this is shown as registering with the diameter of 13", thus giving a radius of 6½". However, if the brake drum has been turned down on the inside, a measurement should be made of the correct diameter and the pivot stud set accordingly. This is done with the two arms 38 and 58 locked together.

The sliding plates 96 are then adjusted by means of the adjusting screws 104 until the line mark 123 aligns with the scale 120 corresponding to the similar diameter marks on the scales 63 and 64. This brings the vertical edge 101 on each plate 96 and the center point 124 on the top plate 51, this being on the radius line 27, the same distance or radius from the center of the pivot stud. The thickness of the flange 89 and of the finished brake lining is then determined. Each of the adjusting pins 111 is first threaded outwardly until its point is approximately at the edge 101 of the plate 96 on which it is mounted. Each screw is then retracted the correct distance indicated by the micrometer adjustment 116 so that the point of each screw is spaced from the edge or point 101, the thickness of the flange 89 and the finished lining. Each contact pin is then locked in position by the lock nut 115. The slidable plates 96 should first be locked in their adjusted position which may be done by means of a wedging disk 125 held in place by a screw 126 (note Figs. 4 and 5); each wedging disk having a surface to engage one of the dove tailed side edges of the adjacent slide plate 96.

When this adjustment has been made the pin 68 may be removed and by means of the handle 92 the whole of the top plate 91 with the arms 58 and 85 may be swung in an arc using the pivot stud 70 as the center. This shifts the concave edge portion 52 of the plate 51 entirely to one side of the grinding wheel 13. The brake shoe with its lining is then adjusted on the upper surface 54 of the top plate 51, the contact pins 111 contacting the inside of the flange 89 of the shoe and the clamping screw 86 being jammed downwardly on the web 87. The shoe should be so located that it extends approximately evenly on opposite sides of the radial line through the arms 58 and 85. The grinding wheel is then started in rotation and the assembly having the top plate 51 with the brake shoe clamped thereto is slowly swung in an arc by means of the handle 92 and the surface of the brake lining is ground off by the grinding wheel 13 starting at one end of the shoe and continuing to the other end. This gives a complete grinding of the brake lining down to a surface indicated by the position of the points 101 on the slide plates 96 and the point 124 on the top plate 51, these having a slight clearance from the grinding wheel. Thus the brake lining may be ground down complete, taking off the high spots down to the lowest spot or portion of the lining. When the brake lining is thus after grinding, positioned at one side of the grinding wheel, the shoe may be removed by merely unthreading the clamping screw 86.

The adjustments made by the sliding plates 96 and the contact pins 101 are not absolutely correct as to measurement for all diameters of drums, hence, it is necessary to lock the scale 120 on the fixed plate 51 empirically, that is by making the actual measurements for certain sized drums.

The micrometer adjustment 116 also gives a close approximation to the thickness of the flange of the brake shoe and the brake lining on a radial line. This may also be made to conform to the slight offset that the axes of the contact pins 111 have with the various radial lines from the pivot stud.

Various changes may be made in the details of construction without departing from the spirit or scope of the invention as defined by the appended claims.

I claim:

1. In a grinding machine for brake shoes, having a pedestal with a rotatable grinding wheel, a base plate rigidly secured to the pedestal and having a longitudinal slot with a screw therein, the screw being on a radial line from the center of the grinding wheel, a rigid top plate having a longitudinal slot, means to temporarily secure the base and top plates with their slots in alignment, a pivot stud threaded on the screw and extending through the slot of the top plate, a clamping device for clamping the top plate to the stud, said device permitting rotation of the top plate on the stud as an axis after removal of the temporary securing means, and means for mounting a brake shoe with its lining on the top plate whereby the shoe may be ground on a radius defined by the distance between the axis of the stud and the periphery of the grinding wheel, the means for mounting the brake shoe comprising a pair of slidable plates mounted on the top plate and each having a sliding motion from a fixed center, the said center being in one position relative to the screw, a contact pin adjustably mounted on each sliding plate to engage the inner side of a flange of a brake shoe, a clamping screw secured to the top plate to engage the web of a brake shoe, the said sliding plates and a portion of the top plate forming a three point contact for the edge of the flange of the brake shoe and the lining attached thereto.

2. In a grinding machine for brake shoes, having a pedestal, a grinding wheel mounted thereon, a fixed structure having an arm with a slot therein, a screw extending through the slot and having a stud threaded thereon, the screw being in radial alignment with the grinding wheel, a top plate having a second arm with a slot, an adjusting means engaging the said stud and the second arm, means to temporarily align said arms to bring the second arm into radial alignment with the grinding wheel, the said top plate having a convex curvature on its edge of a radius equal to the smallest radius of brake shoe to be ground, and means on the top plate to support a brake shoe on its edge, and a clamping means for the brake shoe, the supporting means for the brake shoe on top plate comprising slide plates mounted on the top plate, there being at least two slide plates, one on each side of the radial line from the screw to the grinding wheel, and each slide plate having a contact pin to engage the back of a brake shoe, the two slide plates and the portion of the top plate midway therebetween forming a three point support of an edge of the brake shoe.

3. In a grinding machine for brake shoes, having a pedestal, a grinding wheel mounted thereon, a fixed structure having an arm with a slot therein, a screw extending through the slot and having a stud threaded thereon, the screw being in radial alignment with the grinding wheel, a top plate having a second arm with a slot, an adjusting means engaging the said stud and the second arm, means to temporarily align said arms to bring the second arm into radial alignment with the grinding wheel, the said top plate having a convex curvature on its edge of a radius equal to the smallest radius of brake shoe to be ground, and means on the top plate to support a brake shoe on its edge, and a clamping means for the brake shoe, each of the arms having complementary scales, and a pointer means to indicate the radius of grinding a brake lining, the said scales being in alignment when the two arms are in radial alignment with the grinding wheel, the top plate having slide plates to support the brake shoe and complementary scales on the top plate and slide plates to indicate the radius of grinding of a brake lining.

4. In a grinding machine for brake shoes, a fixed structure having a rotating grinding wheel, a rotatable supporting structure for brake shoes adjustably mounted on the fixed structure on a radius of the grinding wheel, the rotatable structure having at least two slide plates mounted thereon, each slidable on a radius approximately from the center of rotation of the rotatable structure, contact pins adjustably mounted on the slide plates, and a clamp on the rotating structure to clamp a brake shoe.

5. In a grinding machine as claimed in claim 4, the rotatable structure having a convex curve on a portion of its periphery, such curve having a center portion to substantially contact with the grinding wheel, the sliding plates being on opposite sides of the center line, the convex curve being of a radius of the smallest shoe to be ground, the center portion of the rotatable structure and the slide plates being adapted to support the lower edge of a brake shoe with lining for grinding.

6. In a grinding machine for brake shoes having a pedestal with a rotatable grinding wheel, a base plate secured to the pedestal and having an adjusting screw, a pivot stud threaded on said screw, the screw being in a radial line relative to the center of the grinding wheel, a rigid supporting structure having a top plate, means to adjustably clamp the top plate to the stud to provide for a rotation of the top plate on the stud, means for mounting a brake shoe with a lining on the top plate, whereby the supporting structure with its top plate may be turned in an arc on the pivot stud to engage the grinding wheel and grind the shoe on an arc having a radius defined by the axis of the stud and the periphery of the grinding wheel, the means for mounting the brake shoe on the top plate comprising a pair of slidable plates mounted on the top plate, each plate forming with a portion of the top plate a three point contact with an edge of a brake shoe and the lining thereon, and a clamp to secure the brake shoe to the top plate.

7. In a grinding machine having a pedestal with a grinding wheel operating on a vertical axis, a drilling device spaced therefrom, the pedestal having a centering pin offset from the grinding wheel combined with a base plate having a centering perforation engaging the said pin, a set screw attaching another portion of the base plate to the pedestal, the base plate having an arcuate hub extending upwardly therefrom to partly surround the drilling device, a horizontal arm extending from the hub and being radial to the grinding wheel, a top plate having a flat portion resting on the base plate and having a post extending upwardly spaced from the said hub, a second arm connected to the post, an adjustable pivotal connection between the said arms, means for clamping a brake shoe to the portion of the top plate resting on the base plate and means for swinging the top plate with the brake shoe in an arc on the pivotal connection between the said arms for grinding the shoe by the grinding wheel.

8. In a grinding machine as claimed in claim 7, the two arms when in alignment having a beveled edge on substantially the same slope, the beveled edge of each arm having scale graduations, the pivotal connection of the arms being by a pivot stud, a pointer finger connected to the lower end of said stud and having a pointer adjacent the scale on the lower arm, an upper pointer finger mounted on the stud and having a pointer adjacent the scale on the upper arm.

9. In a grinding machine as claimed in claim 7, the portion of the top plate which rides on the base plate having a pair of slidably adjustable plates and such portion of the top plate having a convex curve approximating that of the smallest brake shoe to be ground whereby the edge of the brake shoe is supported on the slide plates and a portion of the top plate between the slide plates and a contact pin adjustably mounted on each slide plate to engage the back of a brake shoe.

10. In a grinding machine for brake shoes having a base plate with a perforation adapted to engage a centering pin on a pedestal, a set screw for attaching another portion of the top plate to a pedestal, the base plate having a flat portion surface adapted to rest on a pedestal, an arcuate hub extending upwardly from the flat portion and adapted to accommodate a drilling device mounted on a pedestal, a first arm extending from the said hub in a direction opposite the center line of the base plate, a top plate having a flat portion to slide on the flat portion of the base plate, a post extending upwardly therefrom and spaced from the hub, a second arm connected to the post and adapted to align with the first arm of the base plate, means to clamp a brake shoe to the top plate, a pivot stud connecting said arms, means to adjust said stud longitudinally of the arms whereby the top plate with the brake shoe may swing in an arc on the said stud as a center and adapted for grinding a brake lining by a grinding wheel mounted on a pedestal.

11. In a grinding machine as claimed in claim 10, the means to adjust the stud comprising a screw on the arm of the base plate, the stud being threaded on the screw, the second arm having a slot, the upper surface of the second arm having teeth, a clamping plate on the stud engaging said teeth, a nut on the stud engaging the clamping plate, the adjacent marginal edges of the said arms having scales, a first pointer arm connected to the lower part of the stud and having a pointer operating over the scale on the first arm connected to the base plate, the clamping plate having a second pointer arm with a pointer operating over the scale of the second arm connected to the top plate.

12. In a grinding machine as claimed in claim 10, the portion of the top plate on which the brake shoe is mounted having a convex edge of a curvature approximating that of the smallest brake shoe to be ground, a pair of slide plates mounted on said portion of the top plate and adjustable thereon, the direction of sliding being approximately radial to the average position of the pivot stud, each sliding plate having a contact pin adjustable thereon to engage the back of a brake shoe in approximately the radial line through the center of the slide plate on which it is mounted, each slide plate having an end portion positioned contiguous to the convex edge of the top plate whereby the edge of a brake shoe may be supported on the two slide plates and a portion of the top plate between the slide plates.

13. In a grinding machine for brake shoes having a grinding wheel, a relatively fixed structure having a first arm, a pivot stud adjustably mounted thereon, a top plate having a second arm adjustable on the stud, each of the arms having complementary scales to be brought into registry, a pointer connected to the stud and operative on the scale on the first arm, a second pointer connected to the stud and operative on the scale of the second arm, the said scales being in alignment when the two arms are in radial alignment with a grinding wheel, the top plate having means to clamp a brake shoe.

14. In a grinding machine for brake shoes having a grinding wheel, a relatively fixed structure having a first arm, a top plate having a second arm, a pivot stud interconnecting said arms and defining a radial distance between the stud and the grinding wheel, each of the arms having complementary scales and a pointer means to indicate the radius of grinding a brake lining, the said scales being in alignment when the two arms are in radial alignment with the grinding wheel, the top plate having slide plates to support the brake shoe, and complementary scales on the top plate and slide plates to indicate the radius of grinding of a brake lining.

15. In a grinding machine, a grinding wheel, a fixed structure having an adjustable pivot stud, a rigid top plate adjustable relative to said stud, a pair of slide plates adjustably mounted on the top plate and sliding approximately in a radial line relative to the pivot stud, the top plate having a convex edge on a curve from the pivot stud approximately the same as that of the smallest brake shoe to be ground, the said slide plates and the portion of the top plate midway therebetween and contiguous to the convex edge being adapted to form a three point support for an edge of a brake shoe having a lining projecting from such edge and a clamping means cooperative with the two slide plates and with the mid portion of the top plate between the slide plates for holding a brake shoe for grinding, the top plate being rotatable on the said stud for bringing a brake lining in contact with the grinding wheel.

16. In a grinding machine as claimed in claim 15, each slide plate being movable to project beyond the convex edge of the top plate to form part of the support for brake shoes of greater radius than the curvature of the convex edge of the top plate and a contact pin adjustably mounted on each slide plate to engage the back of a brake shoe.

17. In a grinding machine as claimed in claim 15, a first pair of scales having one part on the fixed structure and another part on the top plate, these being alignable when parallel to a line through the stud and the center of the grinding wheel to indicate the radial distance from the stud to the periphery of said wheel, and a pair of scales having complementary elements on the top plate and each slide plate to indicate the radius for grinding a brake shoe.

18. In a grinding machine having a grinding wheel, a fixed base plate having an arm positioned in a radial line from the grinding wheel, a top plate having a flat portion resting on the base plate and having a second arm, a stud adjustably mounted on the first arm, a clamp to clamp the second arm to the stud, the two arms when in alignment having a beveled edge of substantially the same slope, the beveled edge of each arm having scale graduations, the pivot stud forming a pivotal connection of the said arms, a pointer finger connected to the lower end of the stud and having a pointer adjacent the scale on the lower arm, an upper pointer finger mounted on the stud adjacent the clamp engaging the second arm and having a pointer adjacent the scale on the second arm.

19. In a grinding machine for brake shoes, a grinding wheel, a base plate having a first arm extending in substantially the center line through the base plate and the grinding wheel, a top plate having a flat portion to slide on a flat portion of the base plate, a second arm connected to the top plate, a pivot stud connecting said arms and means to adjust the stud comprising a screw on the arm of the base plate, the stud being threaded on the screw, the second arm having a slot, the upper surface of the second arm having teeth, a clamping plate on the stud engaging said teeth, a nut on the stud engaging the clamping plate, the adjacent marginal edges of the said arms having scales, a first pointer arm connected to the lower part of the stud and having a pointer operating over the scale on the first arm connected to the base plate, the clamping plate having a second pointer arm with a pointer operating over the scale of the second arm connected to the top plate.

20. In a grinding machine for brake shoes, a grinding wheel, a base plate, an adjustable centering and pivot stud mounted on the base plate, a top plate mounted on the base plate, an interengaging means between the top plate and the stud, the portion of the base plate and the top plate adjacent the stud having complementary scales which may be brought into alignment to indicate the radius for grinding a brake shoe, the portion of the top plate which rides on the base plate having a pair of slidably adjustable plates and such portion of the top plate between the slide plates having a convex curved edge approximating that of the smallest brake shoe to be ground whereby the edge of the brake shoe is supported on the slide plates and a portion of the top plate between the slide plates, a contact pin adjustably mounted on each slide plate to engage the back of a brake shoe, complementary scales on the top plate and each slide plate to indicate the radius for grinding a brake shoe and a clamping means on the top plate to engage a portion of a brake shoe and hold such shoe in a clamped position for grinding relative to the slide plates and the portion of the top plate therebetween.

21. In a grinding machine for brake shoes, a grinding wheel, a fixed base plate, an adjusting screw mounted thereon and extending in a radial line from the center of the grinding wheel, a rigid top plate, a pivot stud longitudinally movable on the screw, a pivot connection between the top plate and the stud, the top plate having means for mounting a brake shoe comprising a pair of slidable plates mounted on the top plate and each having a sliding motion from a fixed center, the said center being in one position relative to the screw, a contact pin adjustably mounted on each sliding plate to engage the inner side of the flange of a brake shoe, a clamping screw secured to the top plate to engage the web of a brake shoe, the said slidable plates and a portion of the top plate between said slidable plates forming a three point contact for the edge of the flange of a brake shoe to position the lining contiguous to the grinding wheel.

LUTHER C. RISHEL.